(12) United States Patent  
Jansen et al.

(10) Patent No.: US 7,764,515 B2  
(45) Date of Patent: Jul. 27, 2010

(54) TWO TERMINALS QUASI RESONANT TANK CIRCUIT

(75) Inventors: Arian Jansen, Lake Forest, CA (US); Mark Telefus, Orinda, CA (US); Bahmar Sharifipour, Westborough, MA (US)

(73) Assignee: Flextronics AP, LLC, Broomfield, CO (US)

( * ) Notice: Subject to any disclaimer, the term of this patent is extended or adjusted under 35 U.S.C. 154(b) by 404 days.

(21) Appl. No.: 11/706,554

(22) Filed: Feb. 14, 2007

(65) Prior Publication Data

US 2007/0263415 A1  Nov. 15, 2007

Related U.S. Application Data

(60) Provisional application No. 60/773,765, filed on Feb. 14, 2006.

(51) Int. Cl.  
*H02M 3/335* (2006.01)

(52) U.S. Cl. .................................. 363/21.02

(58) Field of Classification Search ............. 363/15, 363/16, 21.02, 21.03, 21.12, 97, 131  
See application file for complete search history.

(56) References Cited

U.S. PATENT DOCUMENTS

| | | | |
|---|---|---|---|
| 4,051,425 A | 9/1977 | Smith | 363/86 |
| 4,712,160 A | 12/1987 | Sato et al. | 361/388 |
| 4,788,626 A | 11/1988 | Neidig et al. | 361/386 |
| 4,893,227 A | 1/1990 | Gallios et al. | 363/26 |
| 4,899,256 A | 2/1990 | Sway-Tin | 361/386 |
| 4,901,069 A | 2/1990 | Veneruso | 340/853 |
| 5,101,322 A | 3/1992 | Ghaem et al. | 361/386 |
| 5,164,657 A | 11/1992 | Gulczynski | 323/275 |
| 5,235,491 A | 8/1993 | Weiss | 361/694 |
| 5,295,044 A | 3/1994 | Araki et al. | 361/709 |
| 5,565,781 A | 10/1996 | Dauge | 324/403 |
| 5,592,128 A | 1/1997 | Hwang | 331/61 |
| 5,673,185 A * | 9/1997 | Albach et al. | 363/45 |
| 5,712,772 A | 1/1998 | Telefus et al. | 363/21 |

(Continued)

OTHER PUBLICATIONS

Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.

(Continued)

*Primary Examiner*—Gary L Laxton  
(74) *Attorney, Agent, or Firm*—Haverstock & Owens LLP

(57) ABSTRACT

A power converter includes a transformer, a primary switch, an auxiliary switch, first and second resonance capacitors, and a secondary side rectification means. A switch mode power supply is formed to use reflected voltage and parasitic capacitance as an energy source for a transformer resonance. The auxiliary switch effectively exchanges energy between the primary inductance of the transformer and the first and second resonant capacitors. The auxiliary switch effectively switches the transformer resonance between two distinct frequencies. In one embodiment of the invention, the power converter can be, but is not limited to, a flyback converter and further includes a comparator and a driver. The comparator is for detecting the voltage across the second resonance capacitor and the driver is configured to drive the auxiliary switch based on the output state of the comparator. The resonant nature of the converter provides zero voltage (ZVS) for the primary switch as well as for the auxiliary switch.

46 Claims, 11 Drawing Sheets

U.S. PATENT DOCUMENTS

| | | | |
|---|---|---|---|
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,811,895 A | 9/1998 | Suzuki et al. | 307/125 |
| 5,818,207 A | 10/1998 | Hwang | 323/288 |
| 5,870,294 A | 2/1999 | Cyr | 363/41 |
| 5,894,243 A | 4/1999 | Hwang | 327/540 |
| 5,903,138 A | 5/1999 | Hwang et al. | 323/266 |
| 5,905,369 A | 5/1999 | Ishii et al. | 323/272 |
| 5,923,543 A | 7/1999 | Choi | 363/21 |
| 6,069,803 A | 5/2000 | Cross | 363/21 |
| 6,091,233 A | 7/2000 | Hwang et al. | 232/222 |
| 6,160,725 A | 12/2000 | Jansen | 363/65 |
| 6,272,015 B1 | 8/2001 | Mangtani | 361/707 |
| 6,282,092 B1 | 8/2001 | Okamoto et al. | 361/704 |
| 6,344,980 B1 | 2/2002 | Hwang et al. | |
| 6,396,277 B1 | 5/2002 | Fong et al. | 324/402 |
| 6,407,514 B1 | 6/2002 | Glaser et al. | 315/247 |
| 6,469,914 B1 | 10/2002 | Hwang et al. | 363/210.1 |
| 6,469,980 B1 | 10/2002 | Takemura et al. | 369/275.3 |
| 6,483,281 B2 | 11/2002 | Hwang | 323/299 |
| 6,531,854 B2 | 3/2003 | Hwang | 323/285 |
| 6,541,944 B2 | 4/2003 | Hwang | 323/225 |
| 6,578,253 B1 | 6/2003 | Herbert | 29/605 |
| 6,605,930 B2 | 8/2003 | Hwang | 323/225 |
| 6,657,417 B1 | 12/2003 | Hwang | 323/222 |
| 6,671,189 B2 | 12/2003 | Jansen et al. | 363/21.14 |
| 6,674,272 B2 | 1/2004 | Hwang | 323/284 |
| 6,958,920 B2 | 10/2005 | Mednik et al. | 363/19 |
| 7,038,406 B2 | 5/2006 | Wilson | |
| 7,047,059 B2 | 5/2006 | Avrin et al. | 600/409 |
| 2002/0011823 A1 | 1/2002 | Lee | 320/137 |
| 2003/0035303 A1 | 2/2003 | Balakrishnan et al. | 363/16 |
| 2004/0228153 A1 | 11/2004 | Cao et al. | 363/71 |
| 2005/0105224 A1 | 5/2005 | Nishi | 361/18 |
| 2005/0281425 A1 | 12/2005 | Greuet et al. | 381/331 |

OTHER PUBLICATIONS

EE Times.com-"Team Claims Midrange Wireless Energy Transfer", by R. Colin Johnson, 4 pages, Nov. 6, 2007.

EE Times.com-"Wireless Beacon Could Recharge Consumer Devices", by R. Colin Johnson, 3 pages, Nov. 6, 2007.

"New Architectures for Radio-Frequency dc/dc Power Conversion", Juan Rivas et al. Laboratory for Electromagnetic and Electronic Systems, Massachusetts Institute of Technology, Room 10-171 Cambridge, MA 02139, pp. 4074-4084, Jan. 2004.

Scollo, P. Fichera R., "Electronic Transformer for a 12V Halogen Lamp", Jan. 1999, St Microelectronics pp. 1-4.

Stankovic, Aleksandar M. and Hanock Lev-Ari, "Randomized Modulation in Power Electronic Converters", vol. 90, No. 5, May 2002, pp. 782-799.

Tse, K. K., Chung, Henry Shu-Hung, Hui, S. Y., and H.C. So, "Analysis and Special Characteristics of a Spread-Spectrum Technique for Conducted EMI Suppression", IEEE Transactions on Power Electronics, vol. 15., No. 2, Mar. 2000, pp. 399-410.

* cited by examiner

TWO TERMINALS QUASI RESONANT TANK CIRCUIT

RELATED APPLICATIONS

This application claims benefit of priority under 35 U.S.C. section 119(e) of the U.S. Provisional Patent Application 60/773,765 filed Feb. 14, 2006, entitled "TWO TERMINALS QUASI RESONANT TANK CIRCUIT."

FIELD OF THE INVENTION

The present invention is generally directed to the field of resonant circuits. More specifically, the present invention is directed to two terminals quasi resonant tank circuit.

BACKGROUND OF THE INVENTION

There are several power converter topologies that have been developed over the years, which are intended to improve the power density and switching efficiency of power converters. An emerging focus of new converter topologies is to provide a means to reduce or eliminate converter switching losses, while increasing the switching frequencies. Lower loss and higher switching frequency means more efficient converters, which can reduce the size and weight of converter components. Additionally, with the introduction of high speed composite semiconductor switches, such as metal oxide semiconductor field effect transistor (MOSFET) switches operated by pulse width modulation (PWM), recent forward and flyback topologies are now capable of operation at greatly increased switching frequencies, such as, for example, up to 1.0 MHz.

However, an increase in switching frequency can cause a corresponding increase in switching and component stress related losses, as well as increased electromagnetic interference (EMI), noise, and switching commutation problems, due to the rapid ON/OFF switching of the semiconductor switches at high voltage and/or high current levels. Moreover, modern electronic components are expected to perform multiple functions, in a small space, efficiently, and with few undesirable side effects. For instance, a modern voltage converter that provides for relatively high power density and high switching frequencies, should also include uncluttered circuit topologies, provide for isolation of the output or "load" voltage from the input or "source" voltage, and also provide for variable step-up or step-down voltage transformation.

In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. However, the complexity required to provide control to the power switches (illustrated below as S1 and S2), and the components associated with complex control, create a limited use in commercial applications.

Conventional Flyback Voltage Converter Topology

FIG. 1 illustrates a flyback type voltage converter 100. The converter 100 includes a transformer 102, a resistor 104, two capacitors 106 and 112, and two diodes 108 and 110. The resistor 104 and the capacitor 106 are coupled in parallel. One node of the parallel resistor 104 and the capacitor 106 is coupled to a first terminal of the primary winding of the transformer 102. An anode of the diode 108 is coupled to the primary turns of the transformer 102, and the cathode of the diode 108 is coupled to the other node of the parallel resistor 104 and capacitor 106. An input voltage $V_{IN}$ is coupled to a first terminal of the resistor 104 and to a ground terminal. An anode of the diode 110 is coupled to a first terminal of a secondary winding of the transformer 102. A cathode of the diode 110 is coupled to a first terminal of the capacitor 112. A second terminal of the capacitor 112 is coupled to the second terminal of the secondary winding of the transformer 102. A first terminal of a switching component 115 is coupled to a second terminal of the primary winding of the transformer 102 to provide ON and OFF input power cycles to the transformer 102. A second terminal of the switching component 115 is coupled to a sense resistor 117, which in turn is coupled to ground. A load 114 is typically coupled to the output of the converter 100, at the secondary turns of the transformer 102.

The Flyback topology has long been attractive because of its relative simplicity when compared with other topologies used in low power application. The flyback "transformer" serves the dual purpose of providing energy storage as well as converter isolation, theoretically minimizing the magnetic component count when compared with, for example, forward converter. A drawback to use of the flyback is the relatively high voltage and current stress suffered by the switching components. Additionally, high turn-off voltage (caused by the parasitic oscillation between transformer leakage inductance and switch capacitance) seen by the primary switch traditionally requires the use of a RCD 108,106,104. This parasitic oscillation is extremely rich in harmonics and pollutes the environment with EMI, and causes high switching losses from the switching components in the form of extra thermal dissipation. These switching losses are further described below in relation to FIG. 2.

Conventional Flyback Timing Diagram

Accordingly, the converter 100 is configured to receive the input voltage $V_{IN}$ across the primary turns of the transformer 102, and provide power through the secondary turns of the transformer 102, to a load represented by the resistor 114. Also shown in FIG. 1, current at the primary side of the transformer 102 is proportional to the current flowing through the sense resistor and is represented by $I_{PRI}$, while current at the secondary side is shown by $I_{SEC}$.

The flyback voltage converter 100 suffers from loss, noise, and other inefficient and/or undesirable effects during operation. For instance, FIG. 2 illustrates a diagram 200 of the voltage and current signal curves recorded during the operation of the flyback converter 100 of FIG. 1. As shown in FIG. 2, the diagram 200 includes signals for the input voltage $V_{IN}$, and a drain to source voltage $V_{DS}$ across the switch 115 and current $I_{PRI}$ through the switching component 115, at times t1 through t5. Also shown in this figure, the illustrated signal curves include noise effects and a saw tooth shape that result from the hard switching of the flyback converter 100. The harsh electronic noise effects from ringing are particularly dramatic about the hard switch times of the switching cycle. Further, as mentioned above, these undesirable effects become even more pronounced at the higher switching frequencies required by modern voltage converter applications.

In an effort to reduce or eliminate the switching losses and reduce EMI noise caused by high switching frequencies, "resonant" or "soft" switching techniques are increasingly being employed. Resonant switching techniques generally include an inductor-capacitor (LC) subcircuit in series with a semiconductor switch which, when turned ON, creates a resonating subcircuit within the converter. Further, timing the ON/OFF control cycles of the resonant switch to correspond with particular voltage and current conditions across respective converter components during the switching cycle allows for switching under zero voltage and/or zero current conditions. Zero voltage switching (ZVS) and/or zero current switching (ZCS) inherently reduces or eliminates many frequency related switching losses.

Several power converter topologies have been developed utilizing resonant switching techniques, such as, for example, U.S. Pat. No. 5,694,304 entitled "High Efficiency Resonant Switching Converters," to Telefus, et al., (Telefus), which is hereby incorporated by reference; U.S. Pat. No. 5,057,986 entitled "Zero Voltage Resonant Transition Switching Power Converter," to Henze, et al., (Henze), which is hereby incorporated by reference; U.S. Pat. No. 5,126,931 entitled "Fixed Frequency Single Ended Forward Converter Switching at Zero Voltage," to Jitaru (Jitaru), which is hereby incorporated by reference; and U.S. Pat. No. 5,177,675 entitled "Zero Voltage, Zero Current, Resonant Converter," to Archer, (Archer), which is hereby incorporated by reference.

In particular, Henze describes single ended DC-DC flyback topologies for operation at very high switching frequencies, such as 1.0 MHz or greater. In Henze, a plurality of pulse width modulated (PWM) switches are utilized to effect zero voltage resonant transition switching. Jitaru describes variations of known forward and/or flyback converter topologies employing zero voltage and/or zero current resonant techniques. Jitaru specifically describes a forward converter topology utilizing resonant switching techniques to operate at constant frequency. Archer describes zero voltage, and zero current, switching techniques in resonant flyback topologies utilizing a resonant transformer assembly inserted in parallel with either the primary or secondary winding of the main transformer.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic. For instance, some researchers have implemented an active clamp in conjunction with a resonant converter circuit to realize the benefits of high frequency switching, while reducing its many side effects. See, for example, the United States Patent to Telefus, incorporated by reference above.

SUMMARY OF THE DISCLOSURE

A power converter includes a transformer, a primary switch, an auxiliary switch, first and second resonance capacitors and secondary side rectification means. When the auxiliary switch is on, a first resonance frequency is formed by the energy exchange between the primary inductance of said transformer and said first resonance capacitor. When the auxiliary switch is off, a second resonance frequency is formed by the exchange of energy between said transformer and said first and second resonance capacitors.

In one embodiment of the invention, the power converter can be, but is not limited to, a flyback converter and further includes a comparator to detect the voltage across the second resonance capacitor and driver means to drive the auxiliary switch based on the output state of said comparator.

It is an object of the invention to provide substantially Zero Voltage Switching (ZVS) for the primary switch. It is a further object of the invention to provide substantially Zero Voltage Switching for the auxiliary switch. It is another object of the invention to include the energy stored in most parasitic capacitances in the primary switch, the secondary switch and the transformer in the resonance cycle. It is yet another object of the invention to provide driver means for the auxiliary switch that is independent from the driving means for the primary switch It is yet another object of the invention to extract the energy for said driver means for the auxiliary switch from the main resonance cycle, making the auxiliary switch substantially self driven.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form to not obscure the description of the invention with unnecessary detail.

A detailed description of the principles of operation will be given based on the preferred embodiment of the invention in a power converter of the Quasi Resonant Flyback type. The invention can also be used on other converter types such as, but not limited to, a forward converter.

Figure 1:
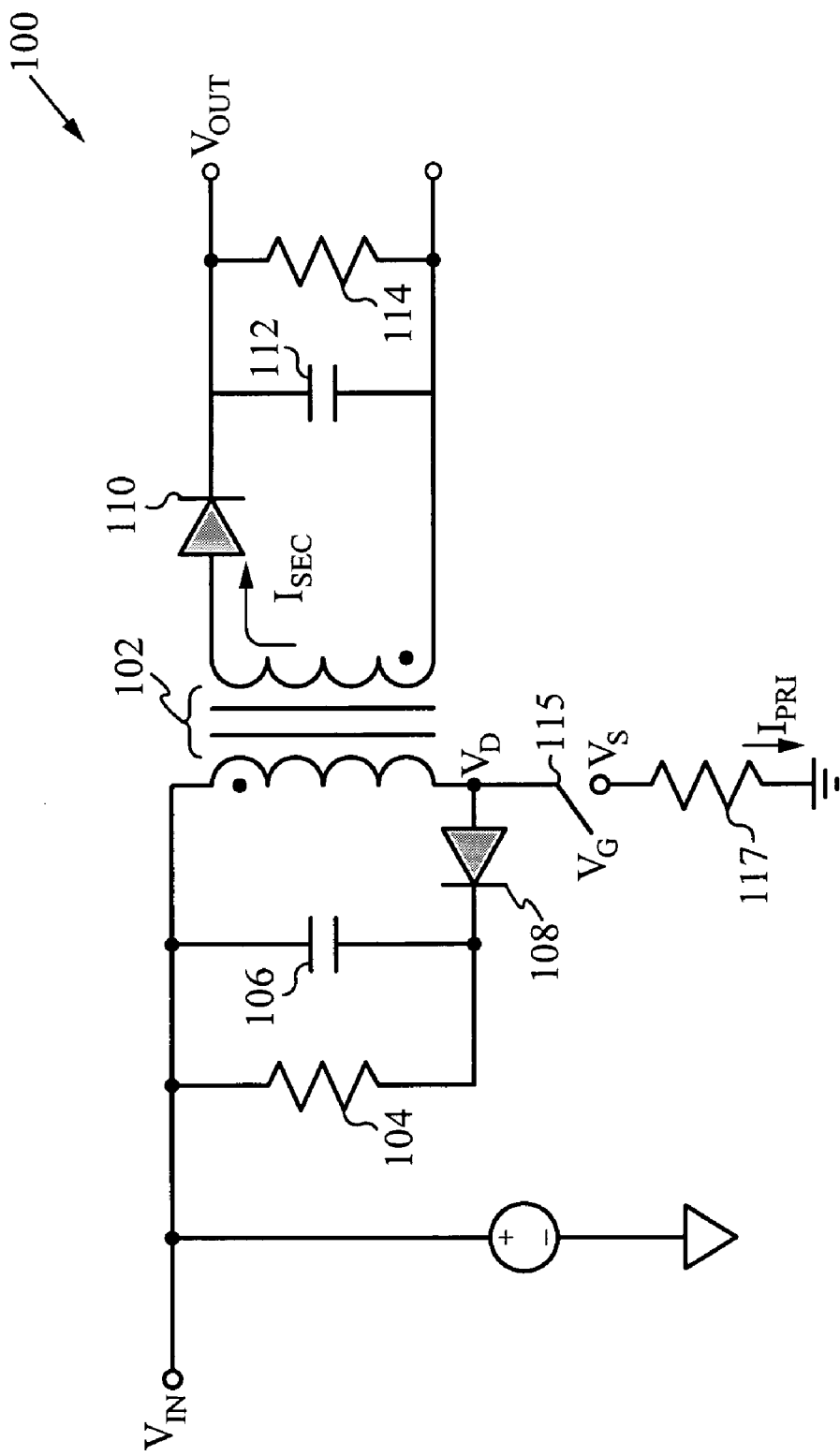
FIG. 1 illustrates a conventional flyback topology.
Figure 2:
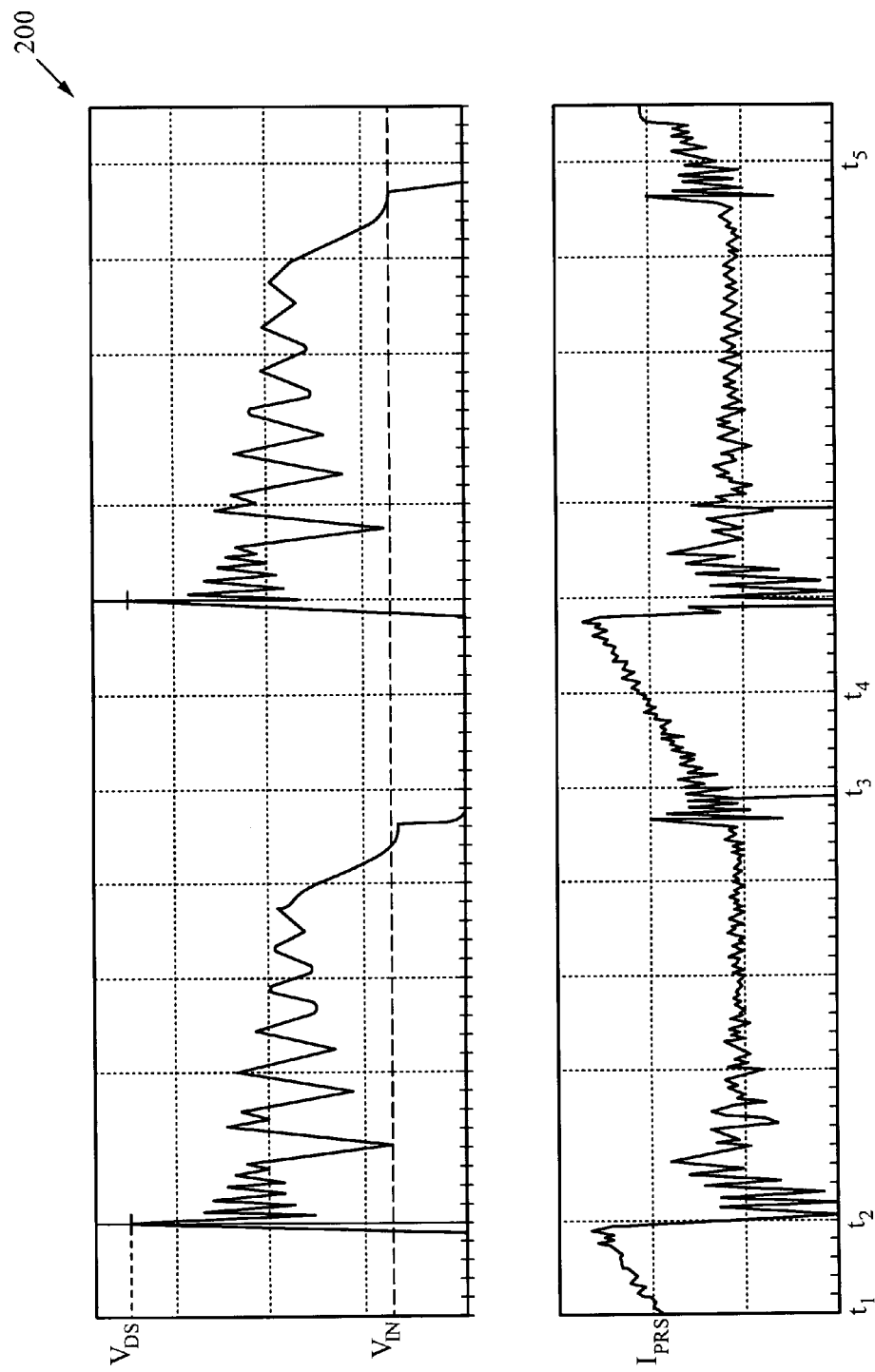
FIG. 2 illustrates a timing diagram for the flyback topology of FIG. 1.
Figure 3:
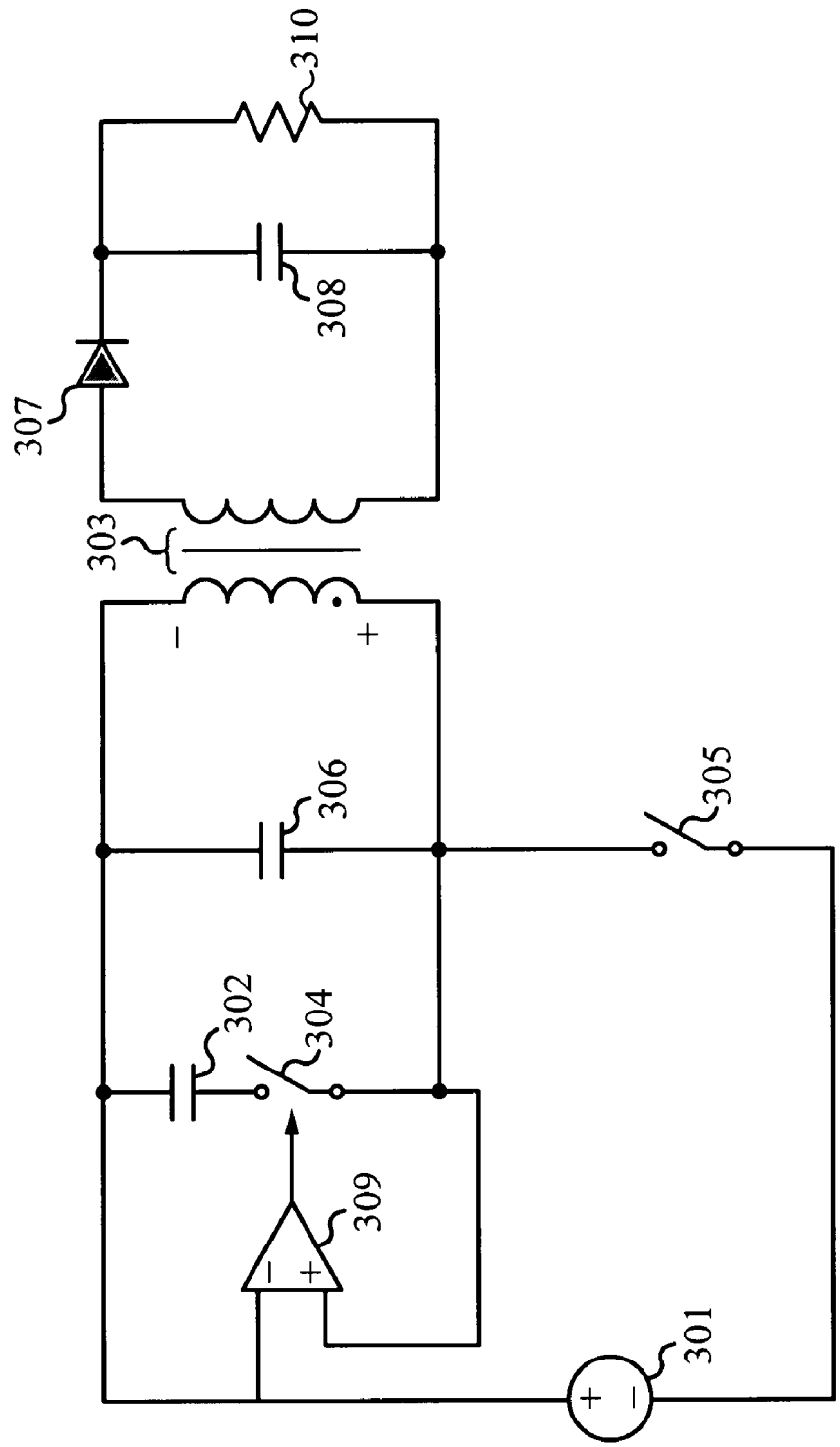
FIG. 3 illustrates a two terminal resonant tank circuit of the present invention.

The circuit of FIG. 3 illustrates a conceptual representation of the invention in a Quasi Resonant Flyback converter. The power converter in FIG. 3 comprises of a transformer (303) with primary and secondary windings, a primary switch (305), an auxiliary switch (304), a first resonance capacitor (306), a second resonance capacitor (302) and a comparator (309) with driving means for the auxiliary switch (304). The converter further includes secondary rectifier means comprising of a diode (307) and a capacitor (308).

The circuit in FIG. 3 further includes a DC power source (301) to provide power to the primary side of the power converter. The comparator (309) and driver means for auxiliary switch (304) are configured such that when the voltage across the primary winding of the transformer (303) is higher than zero, the auxiliary switch will be in the on position. The comparator (309) and driver means for auxiliary switch (304) are further configured such that when the voltage across the primary winding of the transformer (303) is equal or lower than zero, the auxiliary switch will be in the off position. Consequently a first resonance frequency exists for voltages of less than or equal to zero across the primary winding of transformer (303) as a result of the energy exchange between the primary inductance of transformer (303) and the first resonance capacitor (306).

For voltages of higher than zero across the primary winding of the transformer (303), the auxiliary switch (304) will be in the on position and the second resonance capacitor (302) is connected in parallel with the first resonance capacitor (306). Consequently, a second resonance frequency, which is lower in value than said first resonance frequency, exists for voltages of higher than zero across the primary winding of transformer (303) as a result of the energy exchange between the primary inductance of transformer (303) and the first and second resonance capacitors (306 and 302).

Figure 6A:
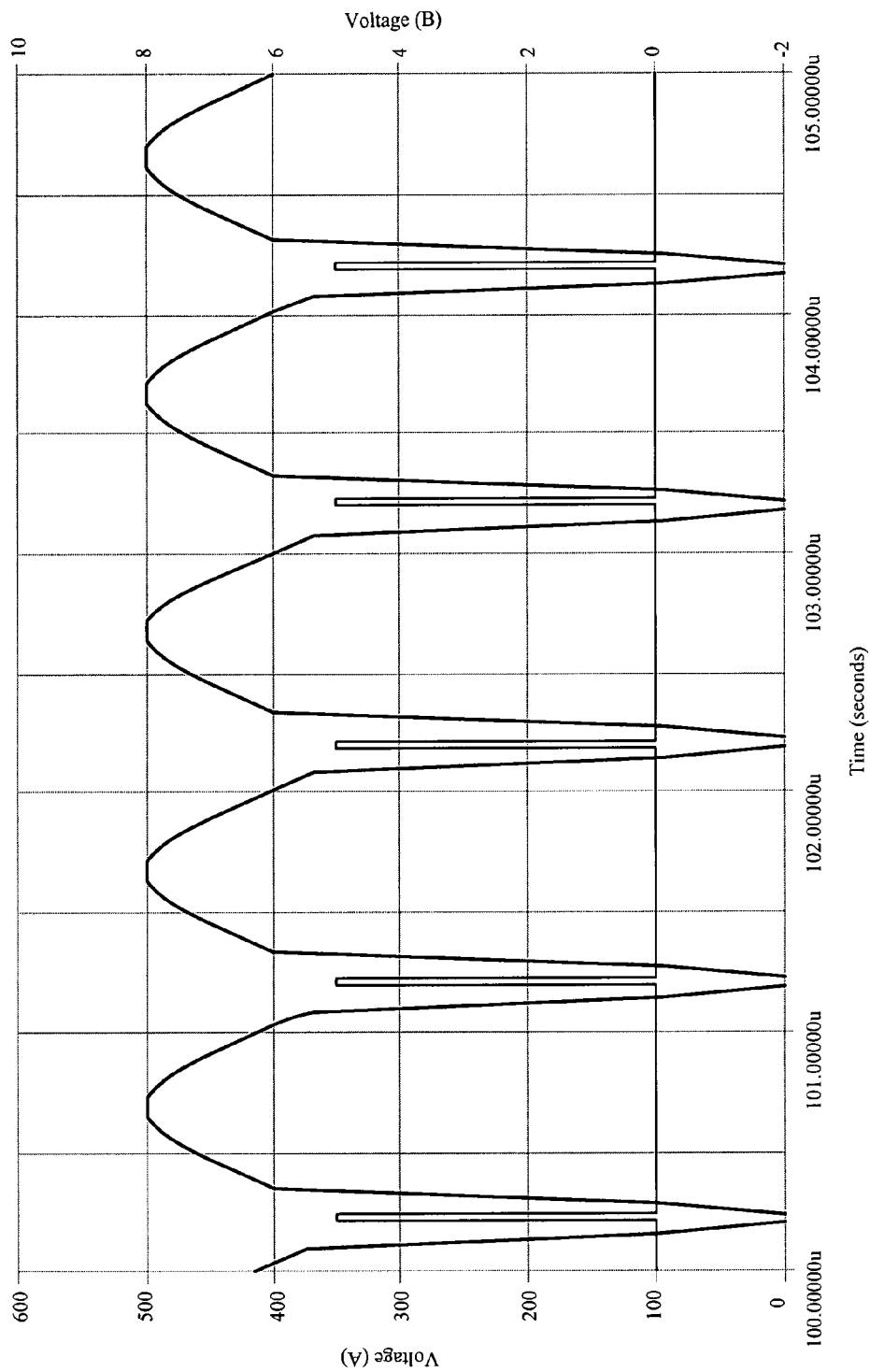
FIGS. 6A, 6B, 6C, 6D and 6E illustrate timing diagrams for the operation of the circuits illustrated in FIGS. 3, 4 and 5.

FIG. 6A represents the drive signal Vgs1 for the primary switch (305), and the voltage Vds1 across the primary switch (305). The following description of a single switching cycle of the power converter from FIG. 3 is based on a steady state continuous waveform under minimum load at the output of the power converter. The invention also provides similar benefits when operating under other circumstances, such as, but not limited to, operation under a load at the output of the power converter and during start-up of the power converter.

When the power converter from FIG. 3 operates under minimum load conditions, the duty cycle of the drive signal (Vgs1) needs to be very small. One switching cycle of the power converter is now discussed from the moment that the primary switch (305) is switched off until the moment that said primary switch is switched on again. At switch off of the primary switch (305) the voltage across the first resonance capacitor (306) is substantially equal to the voltage of the power source (301). As a result of the resonance between the inductance of the primary winding of the transformer (303) and the first resonance capacitor (306), the voltage across the primary switch will increase and consequently the voltage across the first resonance capacitor (306) and the primary winding of transformer (303) will reduce.

After a quarter cycle of the first resonance frequency, the voltage across the primary switch (305) will be substantially equal to the voltage of power source (301) and consequently the voltage across the first resonance capacitor (306) and the primary winding of the transformer (303) is substantially zero. At this moment most of the energy originally stored in the first resonance capacitor (303) is now stored in the inductance of the transformer (303). Also at this moment the auxiliary switch (304) is switched on by comparator (309) and the driving means for the auxiliary switch. As a result of the second resonance between the inductance of the primary winding of the transformer (303) and the first and second resonance capacitors (306 and 304) in parallel, the voltage across the primary switch will further increase and consequently the voltage across the first resonance capacitor (306) and the primary winding of transformer (303) will also increase.

After a quarter cycle of the second resonance frequency, most of the energy stored in the inductance of the transformer will be transferred to the first and second resonance capacitors but in opposite polarity and lower amplitude (Vreset) compared to the original start voltage (Vsource) across the first resonance capacitor (306). As a result of the resonance between the first and second resonance capacitors and the primary inductance of the transformer, the voltage across the primary winding and consequently the voltage across primary switch (305) will start to decline.

After a quarter cycle of the second resonant frequency, most of the energy stored in the first and second resonance capacitors will again be stored in the inductance of the transformer. At that moment the voltage across the first and second resonance capacitors and the primary winding of the transformer is substantially zero. At that moment the auxiliary switch will be switched to the off position again by the comparator and the driver means for the auxiliary switch. After the auxiliary switch is switched to the off position, the resonance will continue based on the original first resonance between the inductance of the primary winding of the transformer and the first resonance capacitor.

After a quarter cycle of the first resonance frequency, the voltage across the primary switch (305) will further reduce until it reaches substantially zero. At that moment the primary switch can switch on under substantially Zero Voltage Switching conditions. The auxiliary switch (302) also switches under substantially Zero Voltage Switching conditions as a result of the comparator (309) which detects the zero voltage point across the primary winding of the transformer (303), which coincides with a substantially zero voltage across the auxiliary switch.

Figure 6B:
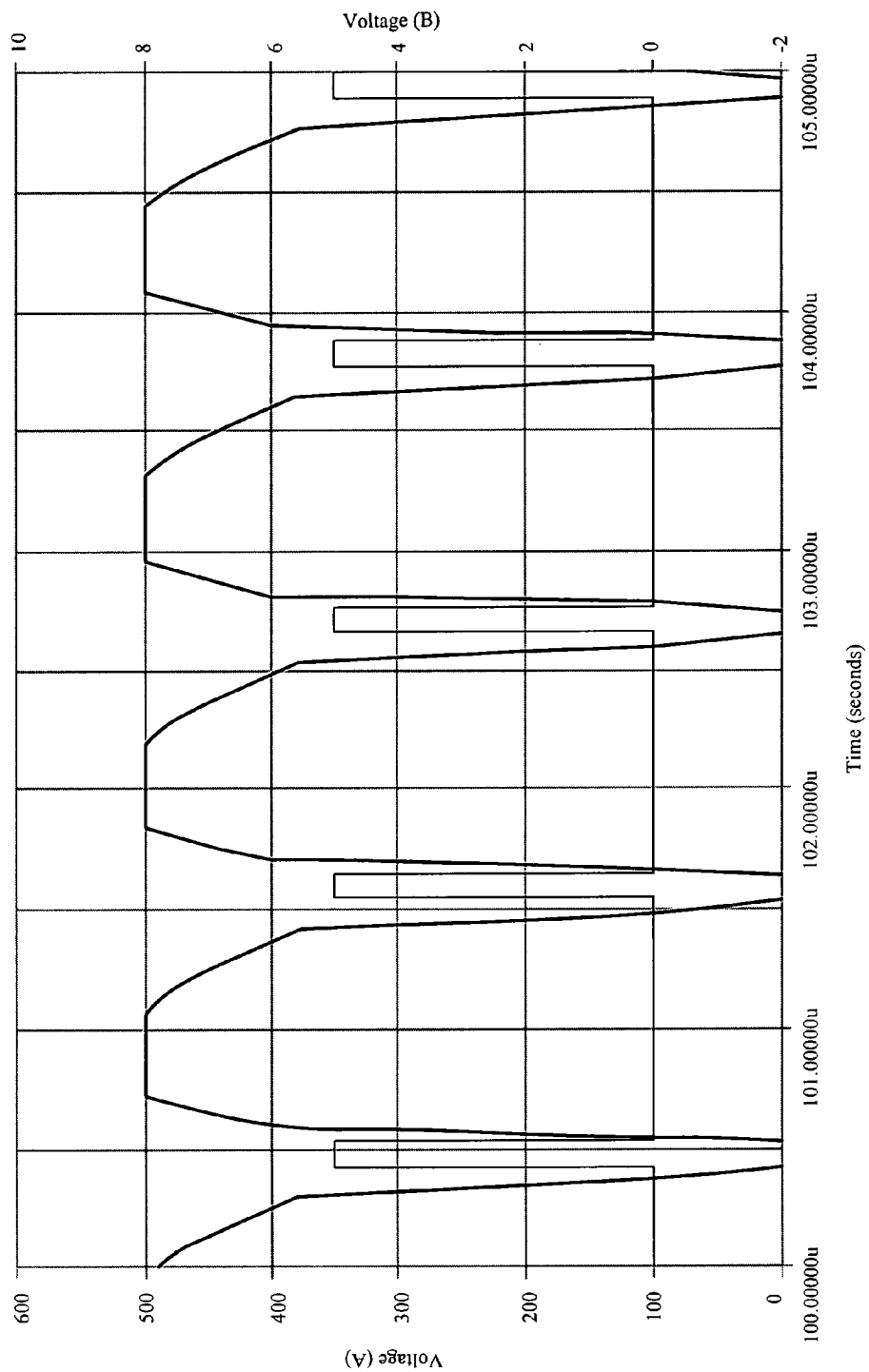

FIG. 6B represents the drive signal (Vgs1) for the primary switch 305, and the voltage (Vds1) across the primary switch 305 in a situation that there is a significant load connected to the secondary side of the power converter of FIG. 3. In this situation, the primary switch (305) is switched on for a longer period in order to charge a larger amount of energy into the inductance of the transformer (303). After the primary switch 305 is switched to the off position, the rise of the voltage (Vds1) across the primary switch 305 progresses in a similar way as described above for the zero load condition.

Once the voltage across the primary switch 305 reaches the level of Vreset, the additional energy in the transformer 303 caused by the longer charge period during the on state of the primary switch 305, discharges through the secondary side of the transformer (303) via the secondary rectifier diode (307) into the secondary smoothing capacitor (308) and eventually into the load (310).

Figure 6C:
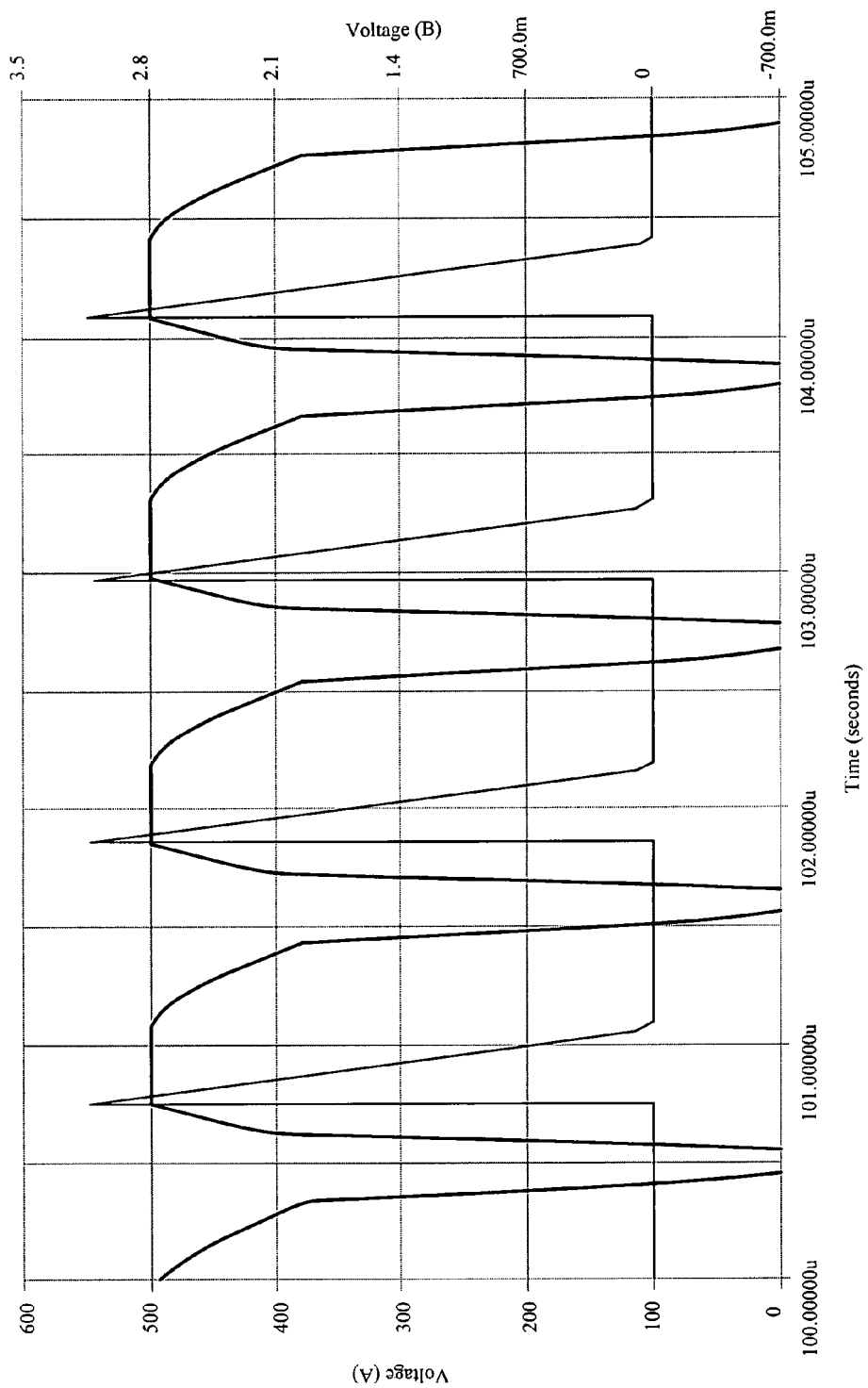

FIG. 6C represents the current ($I_d$) through the secondary rectifier 307 relative to the voltage (Vds1) across the primary switch 305.

Figure 4:
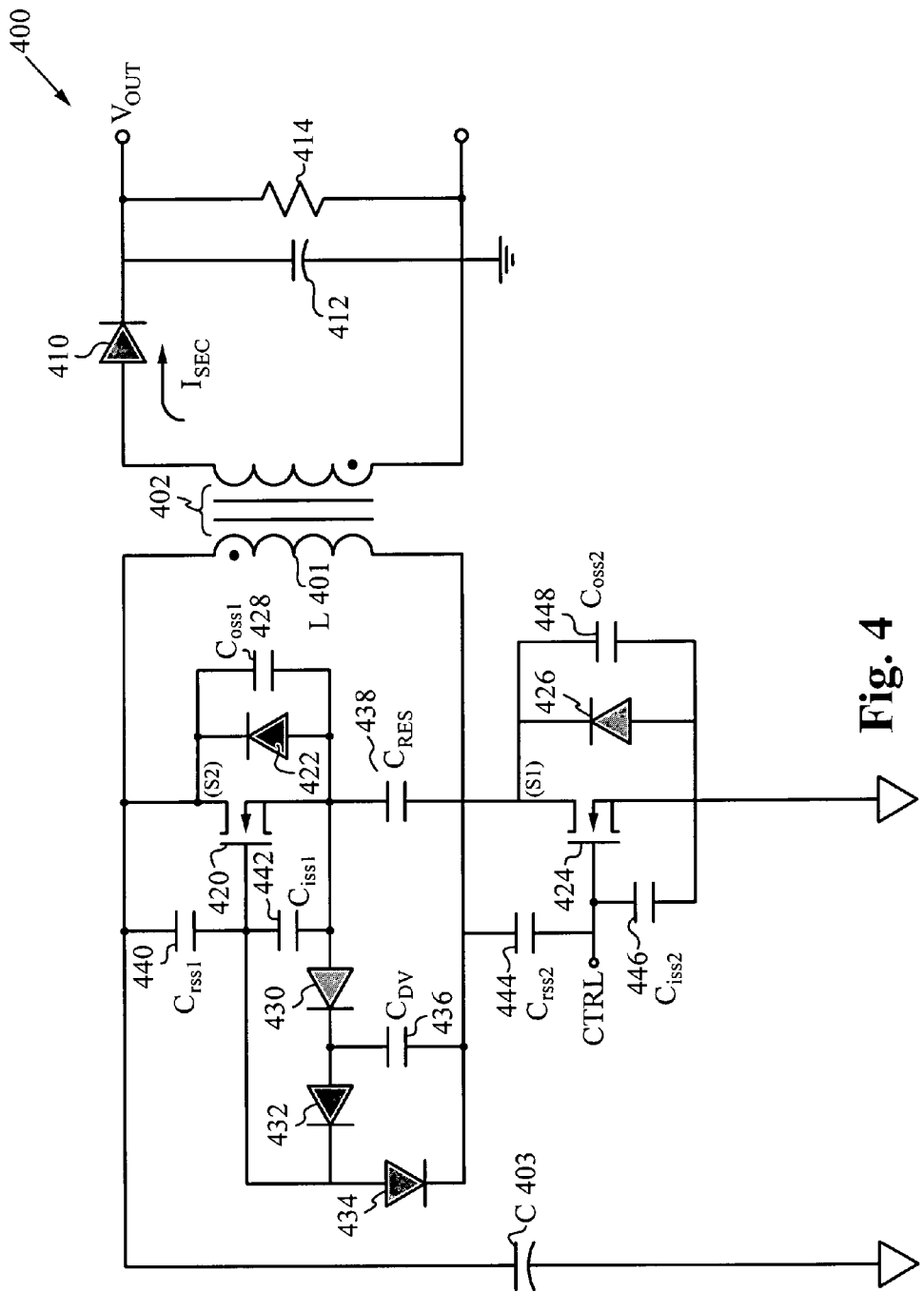
FIG. 4 illustrates an alternate embodiment of a two terminal resonant tank circuit with parasitic capacitances.

FIG. 4 represents a more practical realization 400 of the preferred embodiment of the current invention. The auxiliary switch is represented by a MOSFET (420) with its parasitic capacitances Ciss1 (442), Coss1 (428) and Crss1 (440), and its inherent body diode (422). The auxiliary switch is represented by a MOSFET (424) with its parasitic capacitances Ciss2 (446), Coss2 (448) and Crss2 (444), and its inherent body diode (426). The circuit 400 further includes a transformer (402), driving circuitry for the auxiliary MOSFET comprising of three diodes (430, 432, 434) and a capacitor (436), and secondary rectification means comprising of a rectifier diode (410) and a smoothing capacitor (412).

In slightly simplified form, the first resonance capacitor (302) as it appears in FIG. 3 is represented, in FIG. 4, by the addition of Coss1 (428) and Crss1 (440) in series with Cres (438) plus the addition of Coss2 (448) and Crss2 (444). The second resonance capacitor (306), of FIG. 3, is represented in FIG. 4 by the capacitor Cres (438). As a result of the diodes in the circuit and the switching of the auxiliary MOSFET the effective resonance capacitance, and consequently the resonance frequency, will be slightly different for the four quadrants of the switching cycle in comparison to the resonance frequencies in the simplified circuit of FIG. 3 as can be calculated by one with ordinary skill in the art.

In most single ended power converters such as the flyback converters of FIGS. 3 and 4, it is desirable to keep the reset voltage limited so that the voltage level across the switching MOSFET (Vds1) remains within the safe operating area. In this situation the reset voltage (Vres) across the primary winding of the transformer (402) is lower than (Vde) the voltage across the primary winding of the transformer during the on-time of the primary MOSFET (424). To achieve Zero Voltage Switching for the primary MOSFET the energy (Ehigh) in the effective resonance capacitance at the point of maximum reset voltage (Vres) has to be equal or larger than the energy (Elow) in the effective resonance capacitance just prior to the switch on of the primary MOSFET.

The following equations express the values of Elow and Ehigh as a function of voltages and capacitances:

$$Elow = (Vsource^2(Coss1 + Coss2 + Crss1 + Crss2))/2 \quad \text{EQ1}$$

$$Ehigh = (Vres2(Cres + Coss1 + Crss1 + [Ciss1 \cdot Cdv]/[Ciss1 + Cdv]))/2 \quad \text{EQ2}$$

To meet ZVS for the primary MOSFET the following equation has to be met:

$$Ehigh = Elow \quad \text{EQ3}$$

The value for Cres can be determined from equations EQ1, EQ2 and EQ3.

The preferred embodiment of the invention as represented in FIG. 4 further includes a method for driving the gate of the auxiliary MOSFET from the voltage across Cres (438). At the moment that the rising edge of the voltage across the primary winding of the transformer reaches zero, the body diode 422 of the auxiliary MOSFET (420) starts conducting, which effectively switches on the auxiliary switch (304) as it appears in the simplified circuit of FIG. 3. Also diode (432) starts conducting at this point and starts charging Ciss1 (442) through Cdv (436). The further rising voltage across Cres (438) is divided by the gate drive capacitor Cdv (436) and the addition of parasitic capacitances Ciss1 (442) and Crss1 (440).

When the voltage across Ciss1 reaches the threshold voltage of auxiliary MOSFET (420), said MOSFET will turn on. It is important that the ratio between Vres and the maximum voltage on the gate of MOSFET (420) is chosen to stay within the safe operating area of said MOSFET. Said ratio can be dimensioned with the value of the driver capacitor Cdv (436). The gate voltage of MOSFET (420) will remain substantially the same until the voltage across Cres has reduced to the same level of said gate voltage. When the voltage across Cres further reduces, diode (434) starts conducting and will pull the gate voltage of MOSFET (420) down until it reaches the gate threshold voltage at which point the auxiliary MOSFET (420) switches off. Diodes (430, 432 and 434) further prohibit the voltage across Cres (438) to go significantly below zero.

Figure 6D:
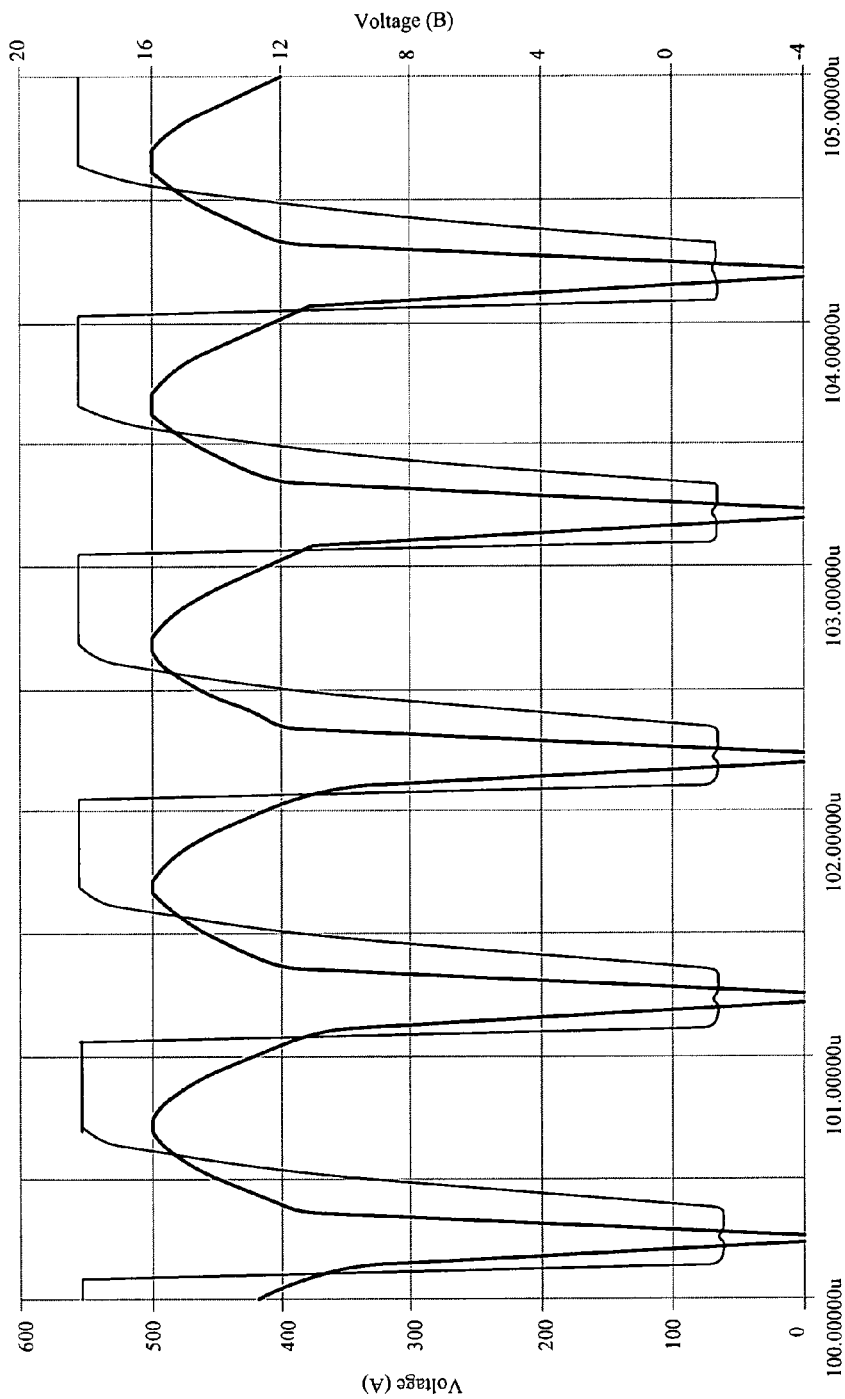
Figure 6E:
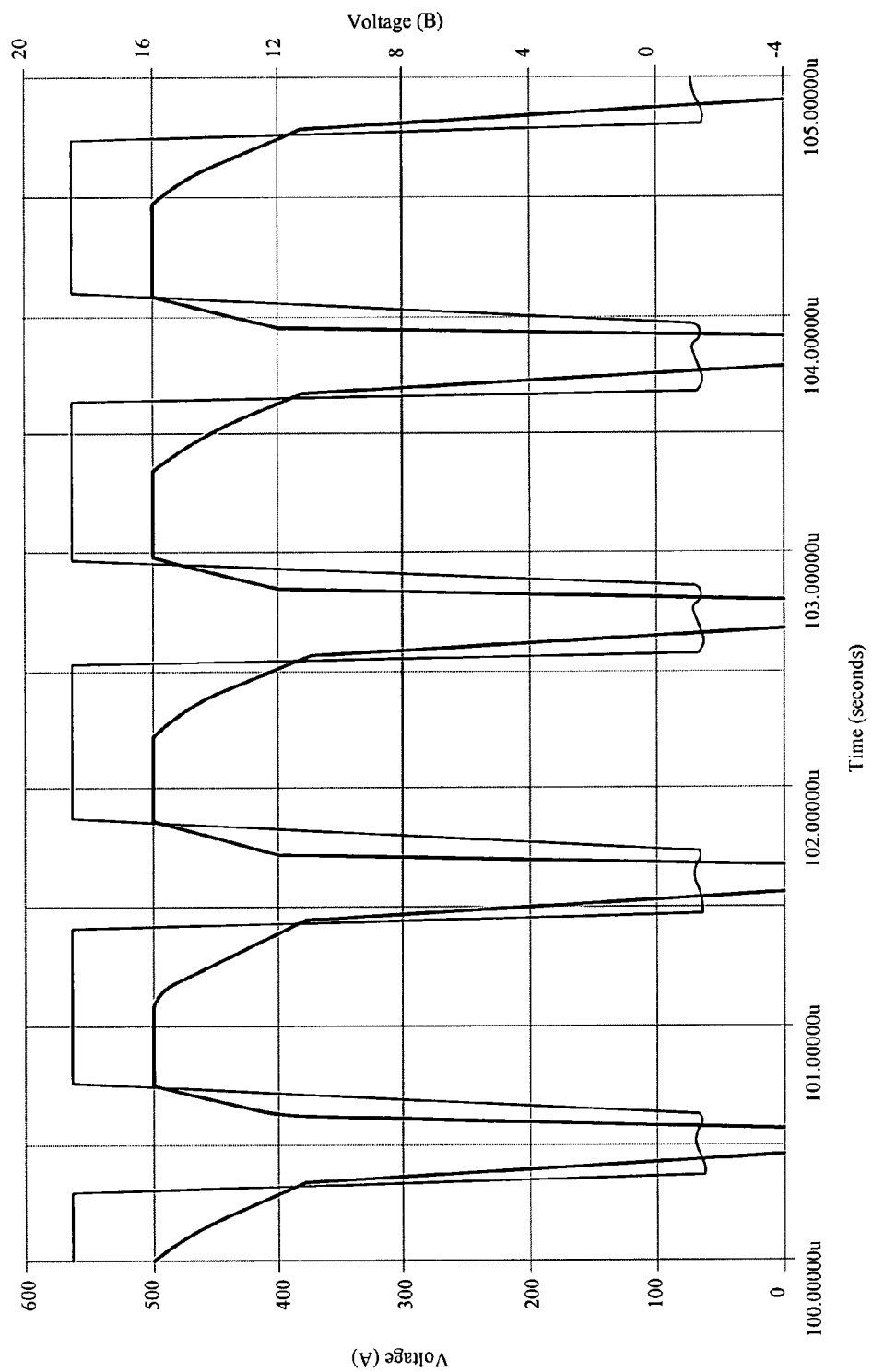

FIGS. 6C and 6D represent the gate voltage of the auxiliary MOSFET (420) relative to the voltage (Vds1) across the primary MOSFET (424), respectively at zero load (FIG. 6D) and under normal load (FIG. 6E).

In a practical circuit using an embodiment of the invention such as, but not limited to, the circuit of FIG. 4, the transformer 402 may include other parasitic components such as, but not limited to, a leakage inductance. An additional resonance between the first and second resonance capacitors and other parasitic components of the transformer may cause additional voltage fluctuations that are superimposed on the waveforms as represented in FIGS. 6A through 6E. These additional voltage fluctuations may distort the waveforms but do not inhibit the principle operation of the current invention.

Figure 5:
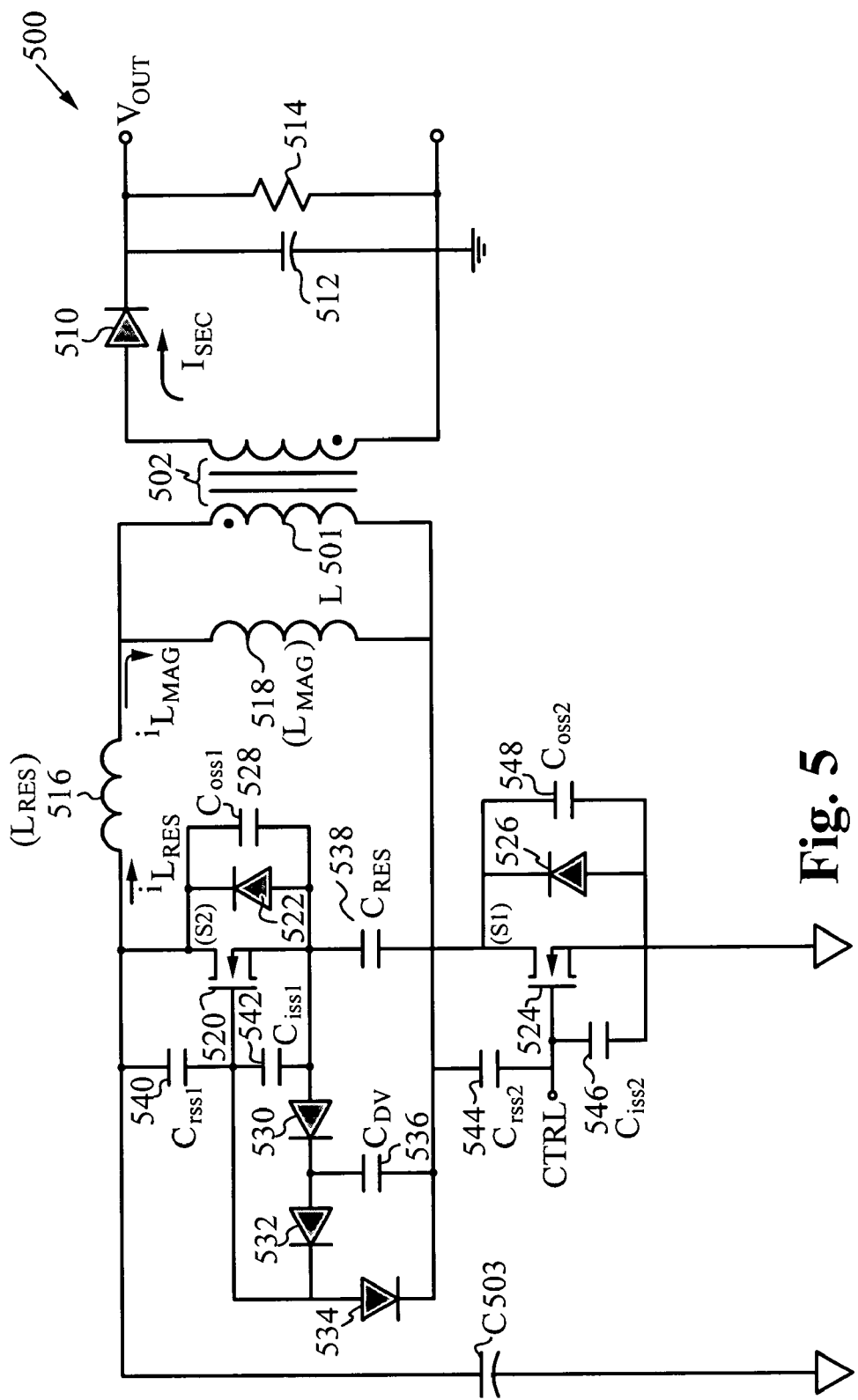
FIG. 5 illustrates the circuit of FIG. 4 with parasitic capacitances and resonances.

As mentioned above, the circuit 300 of FIG. 3 further includes certain parasitic capacitances that store and release energy. FIG. 4 illustrates an alternative implementation for the resonant flyback topology of FIG. 3, with representative parasitic capacitances, while FIG. 5 shows the circuit 400 of FIG. 4, with additional resonances. As shown in FIG. 5, the circuit 500 includes nonparasitic (real) and parasitic capacitances C 503, $C_{DV}$ 536, $C_{RES}$ 538, $C_{rss1}$ 540, $C_{iss1}$ 542, $C_{rss2}$ 544, $C_{iss2}$ 546, $C_{oss1}$ 528 and $C_{oss2}$ 548, and switches S1 and S2. The switch S1 of some embodiments serves as a primary switch and is formed by using a MOSFET 524, a diode 526, and a capacitance $C_{oss2}$ 548, all coupled in parallel. Accordingly, the gate lead of the MOSFET 524 is typically coupled to a controller and/or a driver for the circuit 500. The circuit 500 also includes a diode 510, a capacitor 512, and a load 514 coupled to the secondary turns of a transformer 502, which typically includes a rectifier type circuit.

FIG. 5 further illustrates that the primary turns of the transformer 502 have inductances L 501, $L_{RES}$ 516 and $L_{MAG}$ 518. Hence, the transformer 502 is coupled in parallel to the capacitor $C_{rss2}$ 544, and selectively coupled in parallel to the capacitor $C_{rss1}$ 540 through the switch S2, in an inductor-capacitor (LC) circuit type arrangement. For instance, the capacitor $C_{rss1}$ 540 is selectively coupled and de-coupled from the inductor-capacitor arrangement by using the switch S2 to advantageously vary the properties of the circuit, such as to produce multiple frequencies, for example. As shown in the exemplary embodiment 500 of FIG. 5, the switch S2 serves as an auxiliary switch and comprises a MOSFET 520, a diode 522, and a capacitance $C_{oss1}$ 528, all coupled in parallel. The switching frequencies are further described below and in relation to FIG. 7.

Zero Voltage Switching

The circuits 300, 400 and 500, of FIGS. 3, 4 and 5, advantageously operate by using two distinct frequencies and zero voltage switching. These two frequencies are further described in relation to FIG. 3. The first frequency $f_1$ is generated when the switch 304 is activated. When the switch 304 is activated or ON, the capacitor 302 is coupled in parallel to the inductor-capacitor circuit that includes the capacitor 306 and the primary turns of the transformer 303. Hence, the first frequency $f_1$ is given by:

$f_1 = 1/[2\pi\sqrt{L \cdot \Sigma(C_{302} + C_{306})}]$, where L is the inductance of the primary turns, $C_{302}$ is the capacitance of the capacitor 302, and $C_{306}$ is the capacitance of the capacitor 306, illustrated in FIG. 3; and $$f_2 = 1/[2\pi\sqrt{L \cdot C_{306}}].$$

Figure 7:
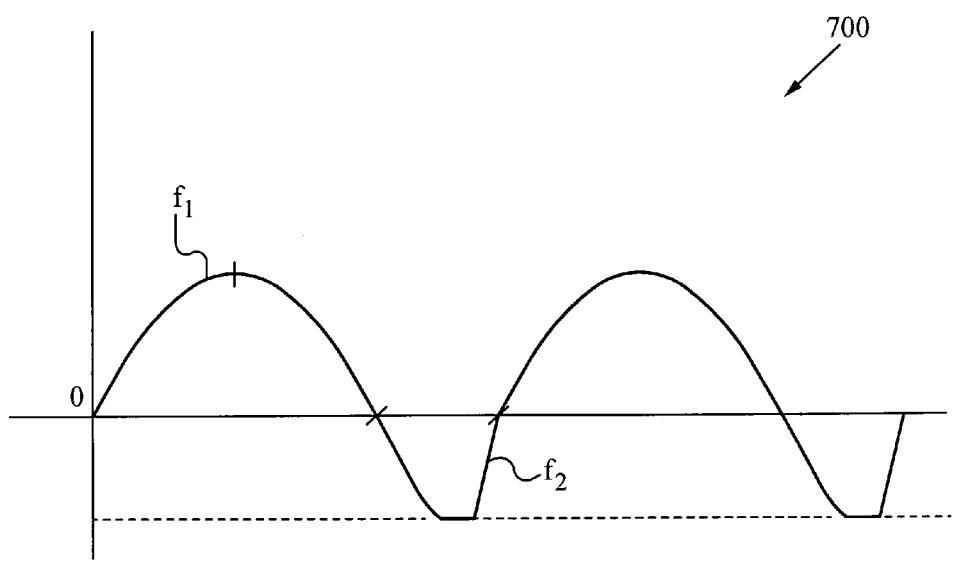
FIG. 7 is a signal diagram having a quasi or sinusoidal shape.

FIG. 7 conceptually illustrates these two distinct frequencies $f_1$ and $f_2$, in relation to the zero voltage switching of some embodiments in further detail. More specifically, FIG. 7 is a signal diagram 700 having a quasi or sinusoidal shape. As shown in this figure, the first frequency $f_1$ is given by the portion of the signal curve above the X-axis, while the second frequency $f_2$ is given by the portion of the signal curve below the X-axis. Also illustrated in this figure, the switching from the first frequency $f_1$ to the second frequency $f_2$ is advantageously by zero voltage switching, while the switching from the second frequency $f_2$ to the first frequency $f_1$ is also by a zero voltage switch. As mentioned above, such switching is more efficient and produces fewer undesirable effects such as, for example, EMI, noise, and harmonics.

ADVANTAGES

In the power conversion industry, one of the most traditional conventional power supply technologies is flyback voltage conversion. Flyback technology converts DC high voltage or DC low voltage by storing and releasing energy. Typically, flyback type conversion is not preferred for high power applications but is considered good for low to medium power conversion, of up to about 100 Watts, for example. Hence, flyback technology is still considered a beneficial topology for particular applications in the power conversion industry in terms of its small implementation size, electrical energy efficiency, and friendliness to the electrical environment (in terms of noise and/or EMI effects). However, in modern high frequency and/or high power applications, conventional technology such as flyback conversion, experiences several undesirable effects as the product of natural phenomena.

For instance, Land's law and Maxwell's law states that a frequency generated magnetic field depends on the operating frequency, such as, for example, the switching frequency in voltage conversion applications. Accordingly, as frequency increases, elements introduced by magnetic fields become smaller. Researchers have exploited this property in a solution for the problem of magnetic effects during voltage conversion. More specifically, by increasing switching frequency, the magnetic fields and properties naturally generated by the fast switching electrical components, become smaller. However, high frequency operation has tradeoffs. For instance, in addition to increased switching losses and noise levels, higher frequency operation by using a large amount of fast, hard switching, further undesirably creates waveforms with increasing harmonics. Hence, the high frequency solutions in the art reduce only one undesirable element. Here, only undesirable magnetic effects are typically reduced, while many other undesirable effects are generated instead.

These further undesirable tradeoff effects require a panoply of patchwork fixes including heat sinks, and larger sized power supplies, that are less efficient and more costly. Thus, the tradeoff of high frequency for lower magnetics creates a net loss in the system. However, due to the laws of physics, reducing undesirable magnetic effects, mandates the use of higher operating frequencies, and its set of undesirable drawbacks.

More specifically, in a power supply, the most complicated components are typically the transformer(s) and the transistor(s). Increasing the switching frequency, reduces the cross sectional area of magnetic field geometry of these electrical components, which reduces the undesirable magnetic effects of the switching. However, the higher operating frequency traditionally causes saw tooth type waveforms. These hard switching waveforms are also indicative of high amounts of noise and losses due to inefficient switching. Further, these noisy, sawtooth type of waveforms are rich with harmonics, which result in further undesirable effects and inefficiency.

In view of the foregoing, some embodiments employ high frequency operation advantageously, by introducing resonant high frequencies, which reduces the effects of hard switching and makes switching "softer." These embodiments, rather than apply patchwork fixes, change the fundamental voltage converter circuit, by applying a resonance (frequency). The embodiments described above illustrate the operation of such a resonant type circuit, which make the switched transistor and diode components of such circuits operate in a 'soft mode,' which more closely resembles a sine wave. Moreover, these embodiments have no, or minimal, switching losses, because the voltage and/or current approach a zero value before the periodic, sinusoidal switch to the rising or falling portion of the sine wave.

In some embodiments, a capacitor and an inductor form the resonance circuit, while some embodiments couple a capacitor (a real component) in parallel with the coil of a transformer (an inherent inductor) to form a parallel resonance circuit. In both these types of implementations, the parasitic capacitances advantageously generate a negative current back to the source. Hence, the parasitic capacitances, which are normally problematic for a system, operate as a large capacitor that stores and releases energy in conjunction with the resonant tank and the real capacitances. Stated differently, all the components are in a full resonance circuit, including the real or active components, and the parasitic components. Therefore, all or most of the energy generated by the components of the system, including the parasitic components, is transferred either to the load (typically in the low frequency mode), or back to the source (in the high frequency mode).

In particular, the cyclical operation of some embodiments implement a quasi resonant storage tank by the generation of a series of dampening sinusoidal wave forms. Some embodiments further maintain, for the system, an energy equilibrium such that the energy of a high frequency cycle is substantially equivalent to the energy of a low frequency cycle.

Also, as mentioned above, some embodiments of the invention have only two terminal nodes. These two terminal implementations have benefits in terms of both manufacturing and commercial aspects. For instance, the resonant tank circuit of some embodiments has active components that couple across the transformer by using only two terminal nodes, provide an elegant design for manufacture. Moreover, the two terminal node design results in only two pins, which has certain commercial and/or packaging advantages.

While the invention has been described with reference to numerous specific details, one of ordinary skill in the art will recognize that the invention can be embodied in other specific forms without departing from the spirit of the invention. For instance, in a particular embodiment the drain voltage $V_D$ on the primary switch 305 illustrated in FIG. 3 can be on the order of 100 volts, while the gate voltage $V_G$ is about 20 volts, the current $I_{PRI}$ is about 200 milliamperes, and $I_{SEC}$ is about 2.0 amperes, while the inductor of some embodiments may be rated at about 600 micro-Henry. However, one of ordinary skill recognizes that these particular signals and values vary for each specific power implementation. Thus, one of ordinary skill in the art will understand that the invention is not to be limited by the foregoing illustrative details, but rather is to be defined by the appended claims.

We claim:

1. A power converter comprising:
a transformer; a resonant type circuit coupled to the transformer, a primary switch, an auxiliary switch, first and second resonance capacitors, and a rectifier located near a secondary side of the transformer; and a flyback type converter, wherein the flyback type converter includes:
a comparator to detect the voltage across the second resonance capacitor, and
a driver to drive the auxiliary switch based on the output state of the comparator.

2. The converter of claim 1, wherein the resonant type circuit, via a commutation of the auxiliary switch, forms the energy exchange between the primary inductance of said transformer and said first and second resonant capacitors, respectively, wherein the commutation comprises an ON-OFF cycle for the auxiliary switch.

3. The converter of claim 1, further comprising: a resonant type circuit switching between two resonant frequencies via the auxiliary switch, wherein the two resonant frequencies are based on the values of the first and second resonant capacitors.

4. The converter of claim 1, wherein the power converter is configured to provide Zero Voltage Switching (ZVS) for at least one of the primary switch and the auxiliary switch.

5. The converter of claim 1, the power converter configured for circulating energy stored in a parasitic capacitance in a resonance cycle, the parasitic capacitance associated with at least one of: the primary switch, the secondary switch, and the transformer.

6. The converter of claim 1, further comprising:
a primary driver for the primary switch, and
an auxiliary driver for the auxiliary switch, the auxiliary driver independent from the primary driver.

7. The converter of claim 1, wherein the power converter is configured to extract energy from a driver for the auxiliary switch from a main resonance cycle, whereby the auxiliary switch is substantially self driven.

8. A power converter comprising:
a transformer;
a resonant type circuit coupled to the transformer, the resonant type circuit comprising:
 a first capacitor coupled to the transformer for operating at a first resonance frequency, and
 a second capacitor selectively coupled in parallel to the first capacitor for operating at a second resonance frequency; and
a flyback type converter, wherein the flyback type converter includes:
 a comparator to detect the voltage across the second capacitor, and
 a driver to drive the auxiliary switch based on the output state of the comparator.

9. A power converter comprising:
a transformer;
a main switch;
a first resonance capacitor coupled to the transformer to form a resonant circuit with the primary inductance of said transformer;
a second resonance capacitor coupled to the transformer through an auxiliary switch to form a resonant circuit with the primary inductance of said transformer;
a switching cycle comprising a first resonant cycle and a second resonant cycle, wherein energy in the first resonant capacitor is substantially transferred to the second resonance capacitor through the first and second resonant cycles;
a comparator; and
driving means to drive the auxiliary switch,
wherein the auxiliary switch switches over when most of the resonant energy is stored in the transformer.

10. The converter of claim 9, wherein the first and second resonance capacitors consist, at least in part, of parasitic capacitances.

11. The converter of claim 9, wherein the first resonant cycle comprises a higher frequency than the second resonant cycle.

12. The converter of claim 9, wherein the converter is of the flyback type.

13. The converter of claim 9, wherein the converter is of the forward type.

14. The converter of claim 9, wherein the converter is of the quasi resonant type.

15. The converter of claim 9, wherein the main switch includes a MOSFET.

16. The converter of claim 9, wherein the main switch includes a bipolar transistor.

17. The converter of claim 9, wherein the auxiliary switch includes a MOSFET.

18. The converter of claim 9, wherein the auxiliary switch includes a bipolar transistor.

19. The converter of claim 9, wherein at least one of the first and second resonance cycles provides substantial zero voltage switching for the main switch.

20. A power converter comprising:
a transformer;
a main switch;
a first resonance capacitor coupled to the transformer to form a resonant circuit with the primary inductance of said transformer;
a second resonance capacitor coupled to the transformer through an auxiliary switch to form a resonant circuit with the primary inductance of said transformer;
a switching cycle comprising a first resonant cycle and a second resonant cycle, wherein the auxiliary switch is driven from a resonant cycle;
a flyback transformer topology; and
a parametric circuit coupled to the transformer, wherein the parametric circuit is configured to be driven by voltage developed across the transformer during a magnetic flux reset cycle in the flyback transformer topology.

21. The converter of claim 20, wherein a driving circuit for the auxiliary switch comprises two diodes and a capacitor.

22. The converter of claim 20, wherein a driving circuit for the auxiliary switch comprises three diodes and a capacitor.

23. A power converter comprising:
a transformer;
a resonant type circuit coupled to the transformer, the resonant type circuit for providing a switching cycle for the transformer, the switching cycle comprising a first cycle and a second cycle, wherein the resonant type circuit is configured to store and release electromagnetic energy from a set of parasitic and non parasitic components;
a flyback transformer topology; and
a parametric circuit coupled to the transformer, wherein the parametric circuit is configured to be driven by voltage developed across the transformer during a magnetic flux reset cycle in the flyback transformer topology.

24. The converter of claim 23, wherein the set of parasitic and non parasitic components forms an inductor-capacitor (LC) quasi resonant type circuit.

25. The converter of claim 23, further comprising:
a source; and
a load, wherein the power converter is configured to store and release energy from the parasitic and non parasitic components to the load and back to the source in a resonant type operation.

26. The converter of claim 23, wherein the circuit is configured for high frequency operation.

27. The converter of claim 23, wherein the first cycle is a high frequency cycle.

28. The converter of claim 23, wherein the second cycle is a low frequency cycle.

29. The converter of claim 23, wherein the resonant circuit is configured to provide the switching cycle to the transformer without the need for external control.

30. The converter of claim 23, wherein the resonant circuit is energy efficient.

31. The converter of claim 23, wherein the resonant circuit is parametrically adaptive.

32. The converter of claim 23, wherein the resonant circuit is self oscillating.

33. The converter of claim 23, wherein the resonant circuit is a quasi resonant tank type circuit (QRTC).

34. The converter of claim 23, wherein the resonant circuit comprises a MOSFET.

35. The converter of claim 23, wherein the resonant circuit provides zero voltage switching, and zero current switching, for a plurality of conditions, and without the need for external control.

36. The converter of claim 23, wherein the resonant circuit allows an increase of the switching frequency to minimize a magnetic effect.

37. The converter of claim 23, wherein the resonant circuit is configured to eliminate a switching loss.

38. The converter of claim 23, wherein the resonant circuit is configured to minimize a stress factor for a switching component.

39. The converter of claim 23, wherein the resonant circuit is configured to minimize a stress factor for a filter component.

40. The converter of claim 23, further comprising a low voltage application coupled to the secondary coil of the transformer.

41. The converter of claim 23, further comprising:
a resonance current;
a zero voltage switch loop for circulating the resonance current.

42. The converter of claim 23, further comprising:
a forward converter bridge configured to provide a resonant reset for the transformer.

43. The converter of claim 23, further comprising an active clamp.

44. The converter of claim 23, further comprising integration with a controller for providing control to the resonance circuit.

45. The converter of claim 23, further comprising more than two terminal nodes.

46. The converter of claim 23, wherein the converter is implemented for motor control.

* * * * *

UNITED STATES PATENT AND TRADEMARK OFFICE
CERTIFICATE OF CORRECTION

PATENT NO.        : 7,764,515 B2                                                             Page 1 of 1
APPLICATION NO.   : 11/706554
DATED             : July 27, 2010
INVENTOR(S)       : Jansen et al.

It is certified that error appears in the above-identified patent and that said Letters Patent is hereby corrected as shown below:

IN THE COVER PAGE

Item (75) Inventors, please replace the inventor name "Bahmar Sharifipour" with "Bahman Sharifipour" so that the item correctly reads:

(75)   Inventors:     Arian Jansen, Lake Forest, CA (US);
                      Mark Telefus, Orinda, CA (US)
                      Bahman Sharifipour, Westborough, MA (US)

Signed and Sealed this

Seventh Day of September, 2010

David J. Kappos
*Director of the United States Patent and Trademark Office*